United States Patent [19]

Erickson

[11] Patent Number: 4,663,818
[45] Date of Patent: May 12, 1987

[54] INSERT CARTRIDGE AND TOOLHOLDER FOR AUTOMATIC INSERT CHANGER AND METHOD OF CHANGING

[75] Inventor: Robert A. Erickson, Latrobe, Pa.

[73] Assignee: Kennametal, Inc., Latrobe, Pa.

[21] Appl. No.: 854,721

[22] Filed: Apr. 16, 1986

Related U.S. Application Data

[63] Continuation of Ser. No. 679,481, Dec. 7, 1984, abandoned.

[51] Int. Cl.$^4$ .............................................. B23Q 3/155
[52] U.S. Cl. ................................... 29/426.3; 29/568; 82/36 B; 211/1.5; 407/105
[58] Field of Search ............... 29/426.3, 568, 26 A; 82/36 A, 36 B; 407/104, 105; 211/1.5

[56] References Cited

U.S. PATENT DOCUMENTS

| | | | |
|---|---|---|---|
| 3,368,265 | 2/1968 | Kirkham | 29/568 |
| 4,414,733 | 11/1983 | Janotik et al. | 29/568 |

FOREIGN PATENT DOCUMENTS

| | | | |
|---|---|---|---|
| 0044914 | 5/1981 | European Pat. Off. | |
| 0052023 | 9/1981 | European Pat. Off. | |
| 2619939 | 12/1977 | Fed. Rep. of Germany | 29/568 |
| 0102447 | 8/1981 | Japan | 29/568 |

*Primary Examiner*—Z. R. Bilinsky
*Attorney, Agent, or Firm*—John J. Prizzi

[57] ABSTRACT

A toolholder and insert cartridge are disclosed in which an insert cartridge holds multiple, similarly-shaped inserts in a face-to-face relation in a storage chamber. The insert cartridge has means thereon for dispensing individual inserts one at a time and can be adapted to be held and moved by a robotic arm or a reciprocal moving holder. A toolholder having an insert pocket with a movable insert seat therein is utilized with the insert cartridge. A reciprocably movable drawbar moves the insert seat in the toolholder pocket back and forth so as to clamp and unclamp a cutting insert. When it is signaled to change the insert, the drawbar moves the insert seat out of the insert pocket, thereby unclamping the insert. The insert is then removed from the insert seat and the insert storage cartridge is positioned in proper alignment with the toolholder. The cartridge and toolholder are then engaged so that the insert seat engages the dispensing means on the cartridge unit. The drawbar is then actuated so that the insert seat is moved inwardly into the pocket of the toolholder, thereby taking an insert from the storage chamber of the insert cartridge and clamping it in the insert pocket of the toolholder. The toolholder and the insert cartridge are thereby disengaged and the robotic arm on the insert cartridge may move it back to storage position so that machining may continue.

6 Claims, 9 Drawing Figures

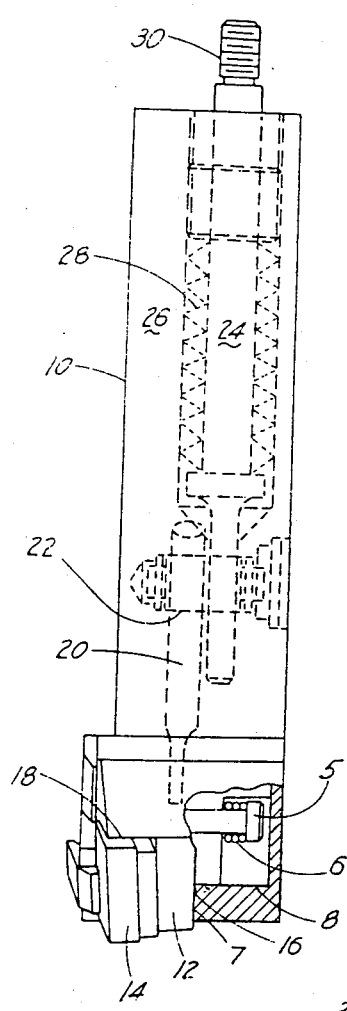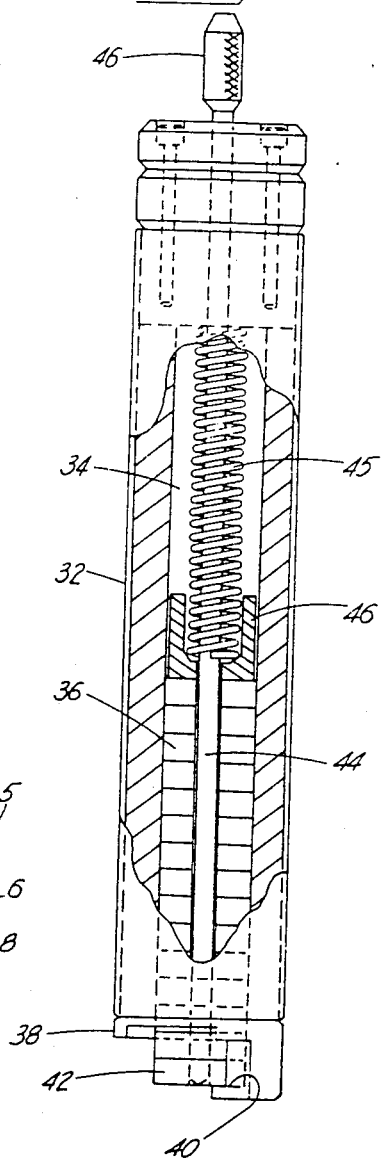

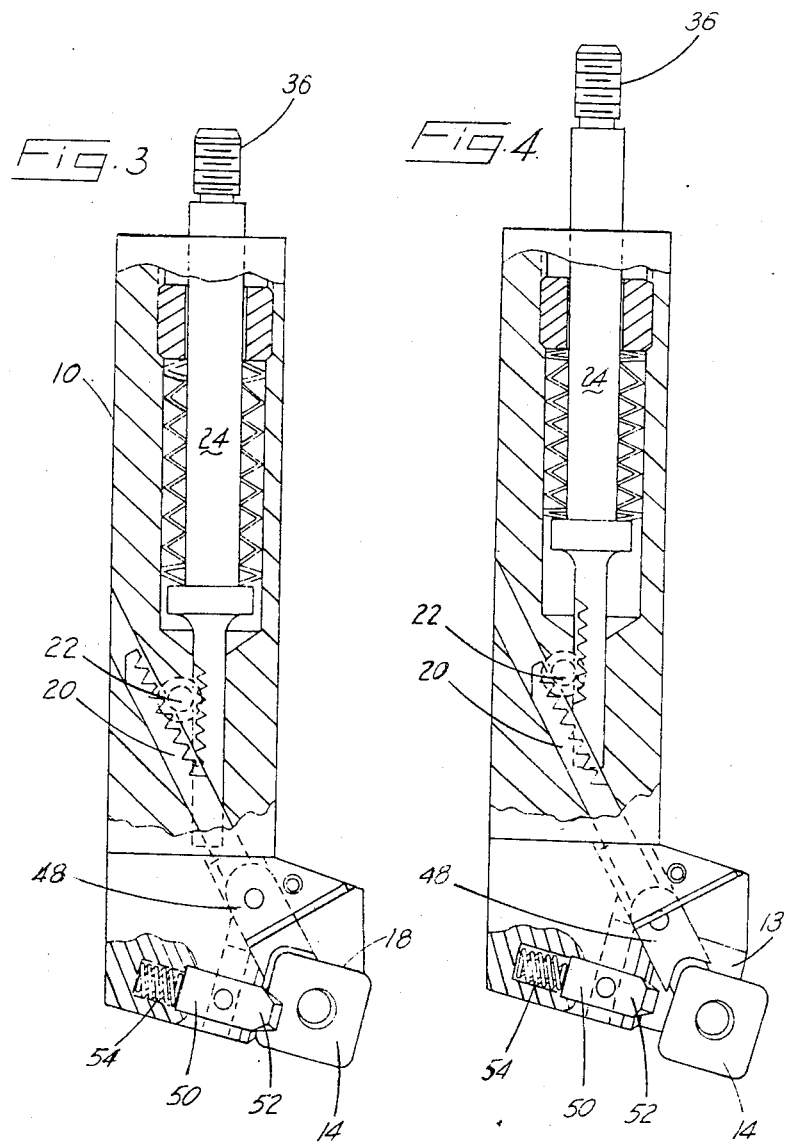

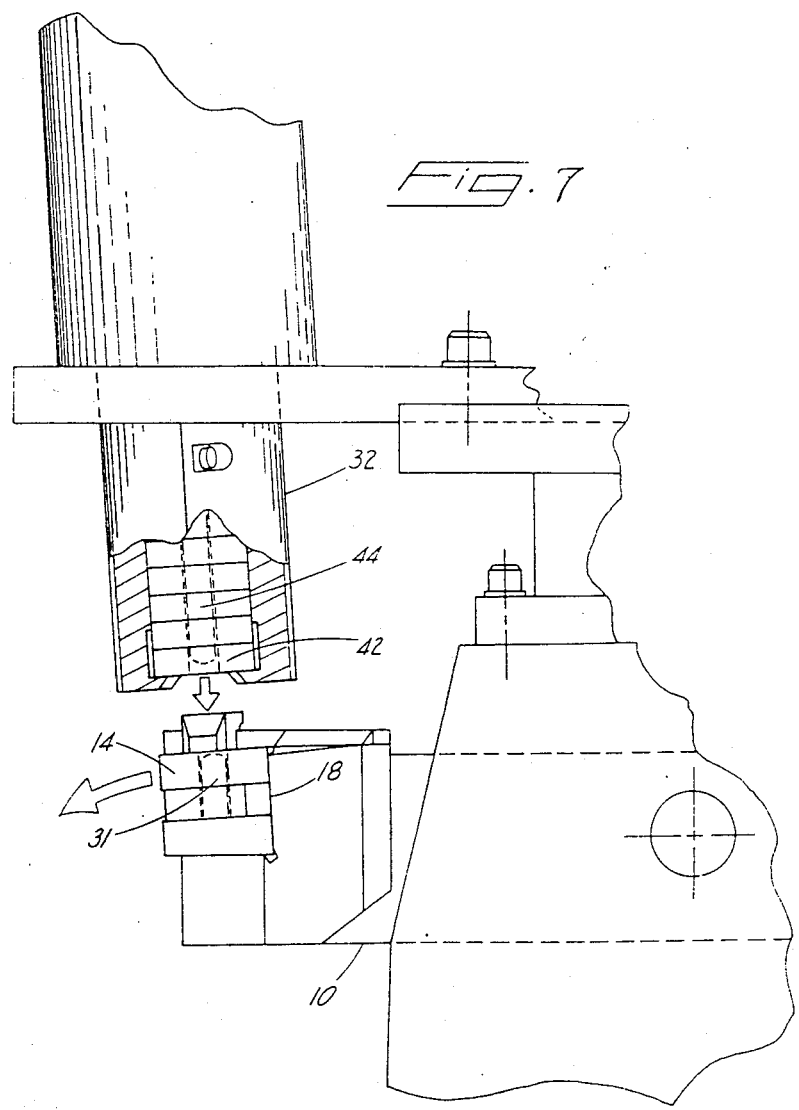

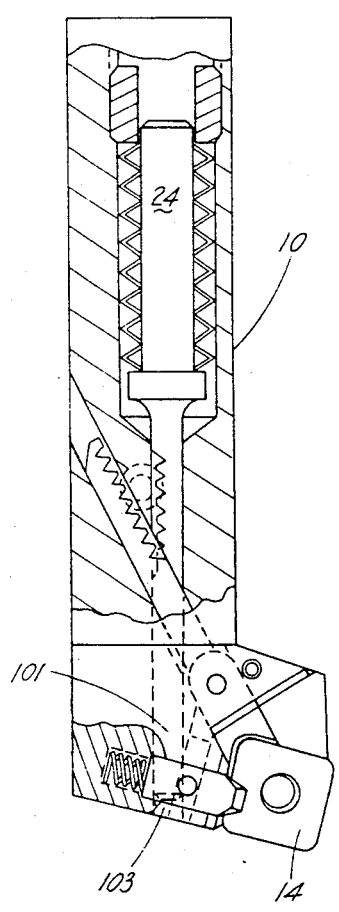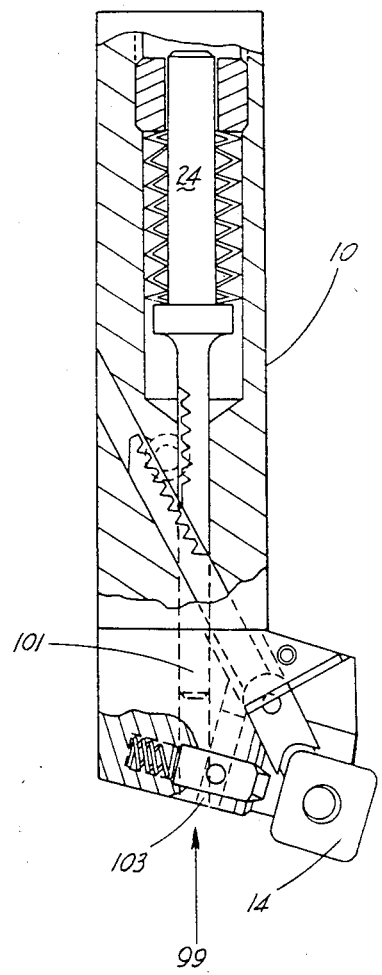

INSERT CARTRIDGE AND TOOLHOLDER FOR AUTOMATIC INSERT CHANGER AND METHOD OF CHANGING

This application is a continuation of application Ser. No. 679,481 filed Dec. 7, 84 abandoned.

BACKGROUND OF THE INVENTION

The present invention is concerned with the automatic changing of cutting inserts on toolholders when they become damaged or worn during a machining cycle.

In the machining of materials utilizing toolholders with replaceable cutting inserts, a great deal of work has been done in trying to make the machining process a very efficient one. One of the inefficiencies of the machining system concerned the changing of the cutting insert when it became dull or worn, and even more importantly, the changing of the cutting insert when it fractured during the machining cycle.

When the insert can no longer be used in the cut, it is necessary to back the toolholder out from the workpiece and either index the cutting insert to another cutting edge or replace it in its entirety. This is usually done by the operator coming in and unclamping the insert with regular or special tooling, picking up the hot insert, utilizing gloves or other special equipment, and indexing or replacing the insert without introducing too much contamination, dirt or debris to the insert seat.

The insert can then be clamped by the operator and the toolholder returned to the workpiece for a test cut to determine if the new cutting edge has the same dimensional cutting ability as the previous cutting edge. If not, the machine tool must be readjusted so as to make up for any tolerancing differences.

In addition to the insert becoming dull and worn, the more catastrophic situation, and the most inefficient, from the standpoint of machining systems, occurs when the end of the life of the insert happens through breakage while the insert is still involved in the cutting of the workpiece. This situation can lead to severe damage, which may cause the scrapping of the workpiece, in addition to the lost time and other things associated with the changing of the insert.

More recently, studies have indicated that there are systems which may measure when a cutting insert is reaching the end of its useful life. When this occurs, a signal may be generated, indicating that the insert should be changed rather than risk any further machining operations.

It is an object of the present invention to provide an automatic insert changer whenever a signal has been generated indicating that the cutting insert has completed its useful life.

It is a further object of the present invention to more efficiently replace the cutting insert than when completed by a machine operator It is a further object of the present invention to provide a toolholder and insert cartridge to provide for long periods of unattended machining operations.

BRIEF SUMMARY OF THE INVENTION

According to the present invention, an insert cartridge mechanism has been designed which comprises an insert storage chamber for holding multiple, similarly-shaped cutting inserts in a face-to-face and stacked relation. One end of the storage chamber is open on at least one side so that inserts may, one at a time, be slid in or out of the chamber.

On the open end of the storage chamber, there is a longitudinal abutment surface to hold the stacked inserts longitudinally in the storage chamber. On the other end of the storage chamber, from the abutment surface, is a spring arrangement for urging the inserts toward said abutment surface.

Preferably, a central rod extends through the storage chamber and engages central holes in the inserts stored therein. A rod means is connected to the spring means and has longitudinal reciprocal movement with one end of the rod extending to the open end of the storage chamber and engaging the central hole in the endmost insert.

Also, according to the present invention, is a toolholder which comprises a shank with one end having an insert pocket with at least a bottom wall and a side wall. Located within the insert pocket is a movable seat with a central pin extending upwardly from the insert seat for engagement with a central hole in an insert. A drawbar extends through the shank of the toolholder and is connected with a means for moving the insert seat forwardly and rearwardly in the insert pocket. When the seat is moved rearwardly in the insert pocket, the pin engaging the center hole of the insert will clamp the insert between the pin and the side wall of the insert pocket.

In addition to clamping the insert against one side wall of said pocket, an additional pivotal clamp has been furnished along another side wall of the pocket, with the clamp having an insert side wall contact portion and an insert top wall contact portion. As the insert is moved into the insert pocket, a side wall of the insert contacts the insert side wall contact portion of the abutment clamp, causing it to pivot downwardly with the insert top wall contact portion firmly pressing down on the insert.

Preferably, the drawbar mechanism comprises a movable rod extending through the shank of the insert, and the rod connects with a rack and pinion arrangement to move the insert seat so that, when the drawbar is pulled or pushed rearwardly on the toolholder, the insert seat is moved forwardly out of the insert pocket. The movable rod means in the shank of the toolholder also, preferably, has means urging it to its forwardmost position within the toolholder.

Also, according to the present invention, is the method of replacing a used or worn cutting insert on the toolholder described above. The method comprises unclamping the used insert on the toolholder by moving the insert seat forwardly in the toolholder pocket and removing the insert from the insert seat. The insert mechanism is then positioned in proper alignment with the insert seat and further engaged with the insert seat so that the upstanding pin on the insert seat mates with the center hole of the insert in the open end of the storage chamber and pushes the central rod rearwardly in the storage chamber.

The method then comprises pushing the drawbar and the toolholder shank inwardly so that the insert seat moves into its clamping position in the toolholder pocket, thereby taking with it the insert formerly located in the endmost position of the storage area of the insert mechanism. The insert mechanism is then moved back to its original position out of the way of the machining efforts.

BRIEF DESCRIPTION OF THE DRAWINGS

The exact nature of the present invention will become more clearly apparent upon reference to the following detailed specification taken in connection with the accompanying drawings in which:

FIG. 1 shows a side view of the toolholder according to the present invention.

FIG. 2 shows a side view with a partial cutaway of the insert cartridge according to the present invention.

FIG. 3 shows a top view with a partial cutaway of the toolholder according to the present invention with the insert in its clamped position.

FIG. 4 shows a top view with a partial cutaway of the toolholder according to the present invention with the insert in its unclamped position.

FIG. 7 is a toolholder of the present invention with the insert cartridge in proper alignment above the toolholder of the present invention.

FIG. 8 is a cut away top view of the toolholder according to the present invention.

FIG. 9 is a cut away top view of the toolholder according to the present invention.

DETAILED DESCRIPTION OF THE INVENTION

Figure 5:
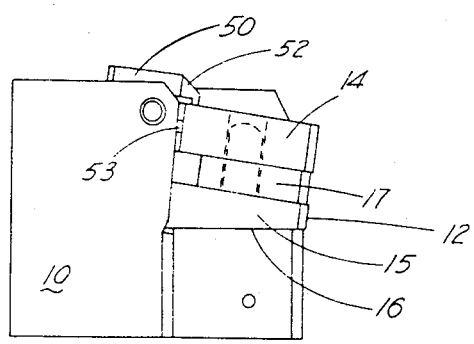
FIG. 5 is a front view of the toolholder of the present invention with the insert in its clamped position.

Referring to the drawings somewhat more in detail, what is shown in FIG. 1 is a toolholder 10 having a movable insert seat 12 with an insert 14 seated thereon. The movable insert seat 12 and the insert 14 are located in an insert pocket having a bottom wall 16 and a side wall 18. The insert seat 12 is connected to means 20 and engages pinion 22 so as to be reciprocably movable in a forwardly manner.

A reciprocably movable rod means 24 extends therethrough the shank 26 of the toolholder 10 and has a spring means 28 urging the rod means 24 to its forwardmost position in the shank 26 of the toolholder 10 so that the insert seat 12 is firmly held in its rearwardmost position in the insert pocket of the toolholder. The movable rod means 24 may have threaded means 30 on one end so as to be connected to a machine tool.

Also shown in FIG. 1 is a shoulder-type screw 5 having a spring means 6 associated therewith that is connected to the bottom portion of the insert seat 12. Shoulder screw 5 and spring 6 hold the insert seat 12 against the shelf 7 of the toolholder as it slides in and out of the toolholder pocket. The shoulder screw 5 provides a positive stop against abutment 8 when the insert seat is moved to its outermost position.

What is shown in FIG. 2 is an insert storage mechanism 32 having an insert storage area 34 for storing multiple, similarly-shaped inserts 36 in a stacked, face-to-face relationship. Inserts 36 are normally polygonally shaped when viewed in plan and have a central hole therethrough to aid in clamping the insert against the bottom wall 16 and the side wall 18 of the insert in the pocket of the toolholder 10.

The insert storage area 34 has an open end 38 that has at least one side open so that the inserts 36 may be removed from the insert storage area 34. The open end 38 has an abutment surface 40 that holds the endmost insert 42 from any longitudinal movement. Rod means 44 extends throughout the approximate center line of the insert storage area 34, extending through the center holes in the inserts 36 and engaging the central hole of insert 42 so as to prevent any lateral movement of insert 42. Spring 45 and cap 46 provide a means for urging the stack of inserts 36 into engagement with the abutment surface 40. Reciprocal movable rod means 44 is also urged toward the abutment end 40, but may be pulled back by handle 46 so that insert 42 may be laterally removed from the insert mechanism through the open end 38.

What is shown in FIG. 3 is a plan view of the toolholder 10 having reciprocably movable rod means 24 with engagement means 36 on the end of the rod 24. Insert seat 12, shown in FIG. 1, has a tongue 48 which connects with means 20 so as to engage the pinion 22. Rod 24 also engages the pinion 22, and it can be seen that the insert 14 is being firmly held against the side wall 18 of the insert pocket. The pivotal clamp means 50 is shown in the clamped position with a top wall insert contact portion 52 pressing downwardly on the top of the insert 14. Spring means 54 urges the pivotal arm 50 to pivot upwardly when the insert 14 is not engaged with the pivotal clamp 50.

What is shown in FIG. 4 is that the rod means 24 has been actuated rearwardly with engagement with end 36, thereby rotating the pinion 22 and causing rod 20 to move the tongue 48 and push the insert seat 12 out of the insert pocket 13. The insert 14 is still seated on the insert seat, and when in this position, may be removed so as to be replaced by another insert 42, shown in FIG. 1a 2. The pivotal arm 50 now has the top insert contact portion 52 rotated to its uppermost position by spring 54.

What is shown in FIG. 5 is a front view of the toolholder 10, showing the insert seat 12 having a lowermost portion 15 and an uppermost portion 17. The insert 14 is seated on the uppermost portion 17 while portion 15 sits on the bottom wall 16 of the insert pocket. The toolholder is now in its clamped position, showing the pivotal arm 50 having contact portion 52 engaging the top of the insert 14 and pressing downwardly and also having a side finger 53 engaging the side wall portion of insert 14.

When in the clamped position, the insert 14 will be clamped and located between the bottom and side walls of the insert pocket and, also, will abut the side wall contact portion 53 of pivotal arm 50 while being pressed down by the top wall contact portion 52 of pivotal arm 50.

Figure 6:
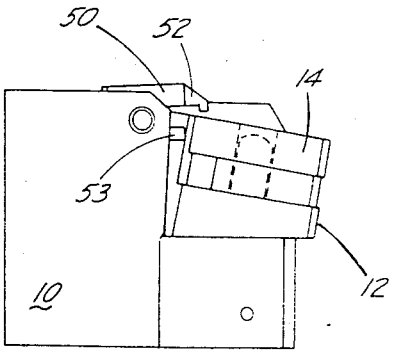
FIG. 6 is a front view of the toolholder of the present invention with the insert in its unclamped position.

What is shown in FIG. 6 is, again, an end view of the toolholder 10 showing the insert 14 in an unclamped position having the insert seat 12 moved out of the insert pocket and showing the pivotal arm 50 rotated to its uppermost position such that the top wall contact portion 52 does not engage insert 14. Further, the side wall contact portion 53 is also not engaging insert 14 and insert 14 may be removed from the toolholder.

What is shown in FIG. 7 is the insert cartridge 32 and the toolholder 10 being held by appropriate means so that the automatic changing of the insert 14 may be accomplished. With the insert cartridge 32 properly positioned above the toolholder 10, the insert 14 may be automatically changed. Proper positioning means that the movable rod 44 is positioned so that when it is lowered it will engage the central pin 31 on insert seat 12.

The central pin 31 on insert seat 12 serves to clamp the insert 14 against the side wall 18 in the insert pocket of toolholder 10. When the insert cartridge 32 is lowered into engagement with the insert seat, pin 31 will push movable rod means 44 upward in the insert storage chamber 24 so that it no longer engages the innermost central hole of the insert 42.

Shown in FIG. 8 is toolholder 10, showing the drawbar 24 with the insert 14 in the clamped position. The drawbar 24 has a front end portion 101 that sits in a through hole that extends to the front part of the toolholder 10.

Through the through hole 103, the drawbar 24 may be actuated as is shown in FIG. 9, such that the insert 14 is moved to the unclamped position. In this manner it may not be necessary for the toolholder to be actuated from the rear. Rather, the insert may be clamped and unclamped from the front of the toolholder 10.

Modifications may be made within the scope of the present invention.

What is claimed is:

1. In a toolholder comprising a shank; an insert pocket on said shank with a bottom wall; a slidable insert seat in said insert pocket; a pin extending upwardly from said insert seat for engagement with a central hole in an insert; means for sliding said insert seat between a first position in which the insert seat is in the insert pocket and a second position in which the insert seat is slid out of the insert pocket, a pivotal clamp along one side wall of said pocket having an insert side wall contact portion and an insert top wall contact portion; said pivotal clamp engaging the insert and pivoting downwardly so as to engage said contact portions when said insert seat is positioned in said insert pocket.

2. A toolholder according to claim 1 wherein said sliding means includes a movable rod extending through said toolholder shank and means connecting said rod to said movable insert seat so that when said rod is moved in one direction said insert seat is moved into said insert pocket to clamp said insert against the contact portions of said pivotal clamp.

3. A toolholder according to claim 2 in which said means connecting said means is a rack and pinion arrangement.

4. An insert storage magazine for delivering an insert to an insert seat with a central pin comprising: an insert storage chamber for holding multiple, similarly-shaped cutting inserts having a central hole therethrough in a face-to-face stacked relationship; an end to said storage chamber open on at least one side and longitudinal abutment means on said end for said inserts; means for urging said stacked inserts into an abutting relationship with said abutment surface; a central rod extending in said storage chamber for engagement with the central holes of said inserts and aligning said inserts with the pin of the insert seat; said rod having longitudinal reciprocal movement with means urging said rod toward said open end of the storage chamber so as to engage the endmost insert; means preventing lateral movement of said insert.

5. A method of replacing a cutting insert carried by an insert seat in the insert pocket of a toolholder comprising the steps of: moving a movable rod assembly connected to said insert seat against a biasing force from a first position in which the insert is clamped by a clamp in the insert pocket to a second position in which the insert is moved out of the insert pocket to an extent that there is no clamping relationship between the clamp and insert; removing the insert from the insert seat; positioning an insert cartridge having a movable central rod to which are engaged one or more replacement inserts relative to the upstanding pin of the insert seat; moving the insert cartridge toward the insert seat so that the movable central rod contacts the pin whereby upon further movement the pin pushes the movable central rod whereby the next replacement insert is engaged by the pin; moving the movable rod assembly from its second position to its first position so that the insert seat is moved into the insert pocket and there is a clamping relationship between the insert and the clamp; and moving the insert cartridge away from the insert seat.

6. A toolholder according to claim 2 further including means for biasing said rod in the one direction.

* * * * *